United States Patent
Dong et al.

(10) Patent No.: US 10,203,218 B2
(45) Date of Patent: Feb. 12, 2019

(54) PREDICTING A VEHICULAR ROUTE OF TRAVEL WITHOUT HISTORICAL ROUTE DATA

(71) Applicant: INTERNATIONAL BUSINESS MACHINES CORPORATION, Armonk, NY (US)

(72) Inventors: Wei Shan Dong, Beijing (CN); Ning Duan, Beijing (CN); Guo Qiang Hu, Shanghai (CN); Ting Yuan, Beijing (CN); Jun Zhu, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 158 days.

(21) Appl. No.: 15/444,936

(22) Filed: Feb. 28, 2017

(65) Prior Publication Data

US 2018/0245940 A1    Aug. 30, 2018

(51) Int. Cl.
| | |
|---|---|
| *G01C 21/00* | (2006.01) |
| *G01C 21/36* | (2006.01) |
| *G01S 19/42* | (2010.01) |
| *G01C 21/34* | (2006.01) |

(52) U.S. Cl.
CPC ..... *G01C 21/3605* (2013.01); *G01C 21/3492* (2013.01); *G01C 21/3626* (2013.01); *G01S 19/42* (2013.01)

(58) Field of Classification Search
CPC ............ G01C 21/3605; G01C 21/3492; G01C 21/3626; G01S 19/42
See application file for complete search history.

(56) References Cited

U.S. PATENT DOCUMENTS

| 8,024,112 | B2 | 9/2011 | Krumm et al. | |
|---|---|---|---|---|
| 2007/0076585 | A1* | 4/2007 | Kim .................. | H04H 20/55 370/206 |
| 2009/0005959 | A1* | 1/2009 | Bargman ............ | G01C 21/00 701/117 |

(Continued)

OTHER PUBLICATIONS

Froehlich, Jon, and John Krumm. Route prediction from trip observations. No. 2008-01-0201. SAE Technical Paper, 2008.

(Continued)

*Primary Examiner* — Adam M Alharbi
(74) *Attorney, Agent, or Firm* — F. Chau & Associates, LLC

(57) ABSTRACT

A method according to the present invention includes predicting a vehicular route. GPS data of a vehicle's position on a road network is received. A digital map representing the road network is received. The digital map includes a plurality of partitioned regions. Each of the partitioned regions includes a plurality of geographic nodes. A starting node is selected. At least one partitioned region is selected based on a predetermined travel-time horizon of the vehicle from the starting node. Route simulation is performed between the plurality of geographic nodes of the selected at least one partitioned region and a plurality of potential future routes is generated. An actual route of the vehicle is detected. The actual route of the vehicle is compared with the plurality of potential future routes. A probability of the vehicle traveling along each potential future route is determined. A future route of the vehicle is predicted.

20 Claims, 10 Drawing Sheets

(56) References Cited

U.S. PATENT DOCUMENTS

2012/0173370 A1* 7/2012 Soroca .............. G06Q 30/0241
705/26.3
2014/0315583 A1 10/2014 Yin

OTHER PUBLICATIONS

Krumm, J.; Gruen, R. & Delling, D.: "From destination prediction to route prediction", Journal of Location Based Services, 2013.
Hendawi, A. M.; Bao, J.; Mokbel, M. F. & Ali, M.: "Predictive tree: An efficient index for predictive queries on road networks", IEEE 31st International Conference on Data Engineering, 2015.
Tiwari, Vishnu Shankar, Sudha Chaturvedi, and Arti Arya. "Route prediction using trip observations and map matching." Advance Computing Conference (IACC), 2013 IEEE 3rd International. IEEE, 2013—Abstract.

* cited by examiner

PREDICTING A VEHICULAR ROUTE OF TRAVEL WITHOUT HISTORICAL ROUTE DATA

BACKGROUND

The present invention generally relates to predicting a vehicular route of travel, and more particularly to predicting a vehicular route of travel without historical route data.

In connected vehicle applications, trajectory prediction of running vehicles may be used in predictive driving assistance services. For example, predictive driving assistance services may provide advanced notification of dynamic road or traffic condition information parking place notification, or commercial location recommendation. As an example, predictive driving assistance services may receive historical data regarding one or more routes that a vehicle has traversed in the past. This data may be referred to as historical route data, and may be used in predicting future vehicle routes of travel. For example, a first route may be traveled by a particular user during weekdays while the user travels to and from a place of employment, while a different second route is commonly traveled by the same user on weekends or holidays when the user is not traveling to work.

As an example, predictive driving assistance services may employ relatively complex and resource intensive analysis of substantially an entire road network when a user travels to an area that they have not traveled to before. Thus, predicting future routes of a vehicle traveling in a new area may be a relatively resource intensive endeavor in the absence of historical route data. Additionally, predicting future routes of a vehicle traveling in a new area may be a relatively slow process in the absence of historical route data, which may result in a delay in alternative route suggestions for a user.

SUMMARY

A computer-implemented method of predicting a vehicular route according to an exemplary embodiment of the present invention includes receiving GPS data identifying a current location of a vehicle on a road network. The method includes receiving a digital map representing the road network. The digital map includes a plurality of partitioned regions. Each of the partitioned regions includes a plurality of geographic nodes. The method includes selecting a starting node from the plurality of geographic nodes based on the current location of the vehicle on the road network. The method includes selecting at least one partitioned region of the plurality of portioned regions based on a predetermined travel-time horizon of the vehicle from the starting node. The at least one portioned region includes a partitioned region in which the vehicle is currently located. The method includes performing route simulation between the plurality of geographic nodes of the selected at least one partitioned region and generating a plurality of potential future routes between the geographic nodes of the selected at least one partitioned region. The method includes detecting an actual route of the vehicle between the geographic nodes of the partitioned region in which the vehicle is currently located. The method includes comparing the actual route of the vehicle in the partitioned region in which the vehicle is currently located with the plurality of potential future routes. The method includes determining a probability of the vehicle traveling along each potential future route of the plurality of potential future routes. The method includes predicting a future route of the vehicle based on the probability of the vehicle traveling along each potential future route of the plurality of potential future routes.

A system according to an exemplary embodiment of the present invention includes a memory storing a computer program, and a network adapter operatively coupled to the memory. The network adapter receives GPS data identifying a current location of a vehicle on a road network. A processor executes the computer program. Based on instructions received from the computer program, the processor receives a digital map representing the road network. The digital map includes a plurality of partitioned regions. Each of the partitioned regions includes a plurality of geographic nodes. Based on instructions received from the computer program, the processor selects a starting node from the plurality of geographic nodes based on the current location of the vehicle on the road network. Based on instructions received from the computer program, the processor selects at least one partitioned region of the plurality of portioned regions based on a predetermined travel-time horizon of the vehicle from the starting node. The at least one portioned region includes a partitioned region in which the vehicle is currently located. Based on instructions received from the computer program, the processor performs route simulation between the plurality of geographic nodes of the selected at least one partitioned region and generating a plurality of potential future routes between the geographic nodes of the selected at least one partitioned region. Based on instructions received from the computer program, the processor detects an actual route of the vehicle between the geographic nodes of the partitioned region in which the vehicle is currently located. Based on instructions received from the computer program, the processor compares the actual route of the vehicle in the partitioned region in which the vehicle is currently located with the plurality of potential future routes. Based on instructions received from the computer program, the processor determines a probability of the vehicle traveling along each potential future route of the plurality of potential future routes. Based on instructions received from the computer program, the processor predicts a future route of the vehicle based on the probability of the vehicle traveling along each potential future route of the plurality of potential future routes.

A computer program product according to an exemplary embodiment of the present invention includes a computer readable storage medium having program instructions embodied therewith. The program instructions are executable by a processor to cause the processor to receive a current location of a vehicle on a road network. The program instructions are executable by a processor to cause the processor to receive a digital map representing a road network. The digital map includes a plurality of partitioned regions. Each of the partitioned regions includes a plurality of geographic nodes. The program instructions are executable by a processor to cause the processor to select a starting node from the plurality of geographic nodes based on the current location of the vehicle on the road network. The program instructions are executable by a processor to cause the processor to select at least one partitioned region of the plurality of portioned regions based on a predetermined travel-time horizon of the vehicle from the starting node. At least one portioned region includes a partitioned region in which the vehicle is currently located. The program instructions are executable by a processor to cause the processor to perform route simulation between the plurality of geographic nodes of the selected at least one partitioned region and generating a plurality of potential future routes between the geographic nodes of the selected at least one partitioned region. The program instructions are executable by a processor to cause the processor to detect an actual route of the vehicle between the geographic nodes of the partitioned region in which the vehicle is currently located. The program instructions are executable by a processor to cause the processor to compare the actual route of the vehicle in the partitioned region in which the vehicle is currently located with the plurality of potential future routes. The program instructions are executable by a processor to cause the processor to determine a probability of the vehicle traveling along each potential future route of the plurality of potential future routes. The program instructions are executable by a processor to cause the processor to predict a future route of the vehicle based on the probability of the vehicle traveling along each potential future route of the plurality of potential future routes.

One or more exemplary embodiments of the present invention provide a system and/or method in which a processing load on a computer processor may be reduced by selectively simulating potential vehicle routes only in selected partitioned regions.

One or more exemplary embodiments of the present invention provide a system and/or method in which a processing load on a computer processor may be reduced by distributing processing of each potential vehicle route in selected partitioned regions through distributed processing in which potential vehicle routes in each portioned region are respectively simulated by different processors, or different groups of processors.

One or more exemplary embodiments of the present invention provide a system and/or method in which a memory capacity of a computer is efficiently utilized by selectively simulating potential vehicle routes only in selected partitioned regions.

One or more exemplary embodiments of the present invention provide a system and/or method in which vehicle routes are simulated by a computer relatively quickly by selectively simulating potential vehicle routes only in selected partitioned regions. For example, route simulation may be performed faster than if all possible routes (e.g., including irrelevant routes) across an entire road network are simulated by selectively simulating potential vehicle routes only in selected partitioned regions.

Thus, faster lead times may be achieved for generating relevant computer-simulated future travel routes of a vehicle without historical vehicle route data. Thus, data packets including future travel routes of a vehicle may be generated by a computer processor relatively quickly, and may be delivered to a user (e.g., via a display in the vehicle) relatively quickly without the need for user input. Additionally, accuracy of predicted vehicle future routes may be increased without the use of historical vehicle route data.

Thus, the system and method according to one or more exemplary embodiments of the present invention may be useful for increasing the speed, accuracy and efficiency of real-time, computer-implemented predictive driving assistance services.

BRIEF DESCRIPTION OF THE DRAWINGS

The above and other features of the present invention will become more apparent by describing in detail exemplary embodiments thereof, with reference to the accompanying drawings, in which.

DETAILED DESCRIPTION

Figure 1:
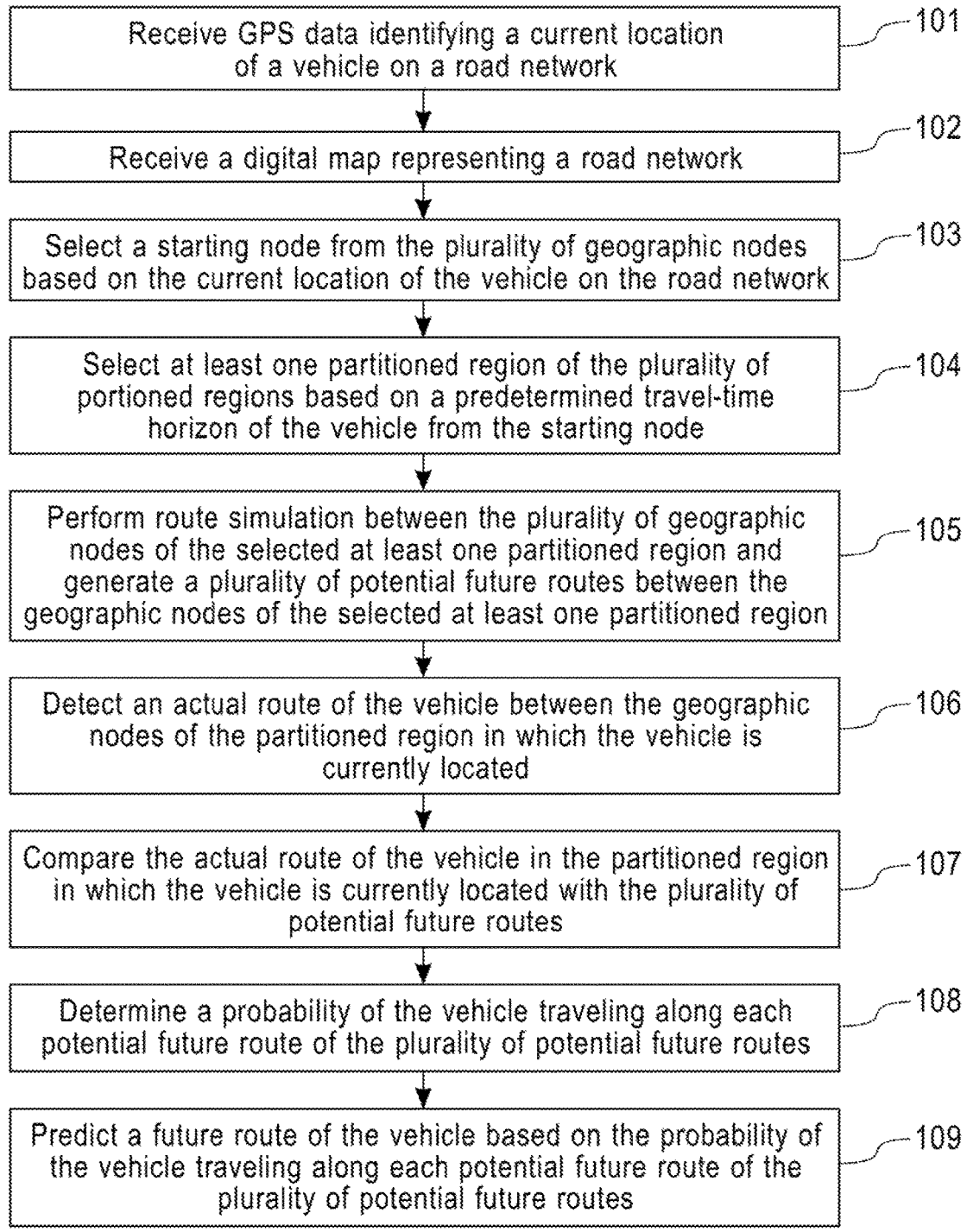
FIG. 1 illustrates a method according to an exemplary embodiment of the present invention.

An exemplary embodiment of the present invention provides a scalable future vehicle route prediction approach that employs road networks. In most cases, drivers tend to follow reasonable routes to their destinations (e.g., shortest path or fastest path). Thus, if a partial trip of a driver is observed, it is possible to predict the driver's future route in this trip by considering only those road links that are able to compose reasonable routes when concatenated to the observed partial trip. Thus, predictions may be made in the absence of, or without reference to, historical route data.

According to an exemplary embodiment of the present invention, starting from the origin of an observed partial trip, reasonable trip routes may be simulated for a prediction window (e.g., the next 15 minutes in the future) and then matched to an observed partial trip. Then a route prediction may be made according to those well matched reasonable routes. As time passes, reasonable routes may be simulated in an expanding road network area. To limit the search space, the whole road network may be decomposed into multiple partitions, and likely routes in each partition may be simulated as they become relevant to a driver (e.g., when the fall within a travel-time horizon of the traveling vehicle). In each round of reasonable route simulation, the system may search for the relevant partitions first, which may be defined as the partitions that are reachable from the driver's latest known location in the next prediction window (e.g., 15 minutes). The earliest reachable time from the trip origin at each of a plurality of boundary nodes at boundaries of relevant partitions may be efficiently computed and stamped onto respective boundary nodes. Then, reasonable routes to each of the boundary node may be simulated in each relevant partition (e.g., in the order of the timing sequence of the boundary nodes' timestamp). In this way, the search space of the reasonable route simulation is largely reduced. At the same time, this allows for efficient and prioritized parallel processing of vehicle routes across portions of a road network. Thus, a scalable and computer resource efficient approach to route simulation and prediction is described herein.

It will be understood that the terms "first," "second," "third," etc. are used herein to distinguish one element from another, and the elements are not limited by these terms. Thus, a "first" element in an exemplary embodiment may be described as a "second" element in another exemplary embodiment.

Exemplary embodiments of the present invention will be described more fully hereinafter with reference to the accompanying drawings. Like reference numerals may refer to like elements throughout the specification and drawings.

FIG. 1 illustrates a method according to an exemplary embodiment of the present invention.

Referring to FIG. 1, a computer-implemented method of predicting a vehicular route according to an exemplary embodiment of the present invention includes receiving GPS data identifying a current location of a vehicle on a road network (Step 101). The method includes receiving a digital map representing the road network. (Step 102). The method includes selecting a starting node from the plurality of geographic nodes based on the current location of the vehicle on the road network (Step 103). The method includes selecting at least one partitioned region of the plurality of portioned regions based on a predetermined travel-time horizon of the vehicle from the starting node (Step 104). The method includes performing route simulation between the plurality of geographic nodes of the selected at least one partitioned region and generating a plurality of potential future routes between the geographic nodes of the selected at least one partitioned region (Step 105). The method includes detecting an actual route of the vehicle between the geographic nodes of the partitioned region in which the vehicle is currently located (Step 106). The method includes comparing the actual route of the vehicle in the partitioned region in which the vehicle is currently located with the plurality of potential future routes (Step 107). The method includes determining a probability of the vehicle traveling along each potential future route of the plurality of potential future routes (Step 108). The method includes predicting a future route of the vehicle based on the probability of the vehicle traveling along each potential future route of the plurality of potential future routes (Step 109).

Figure 2:
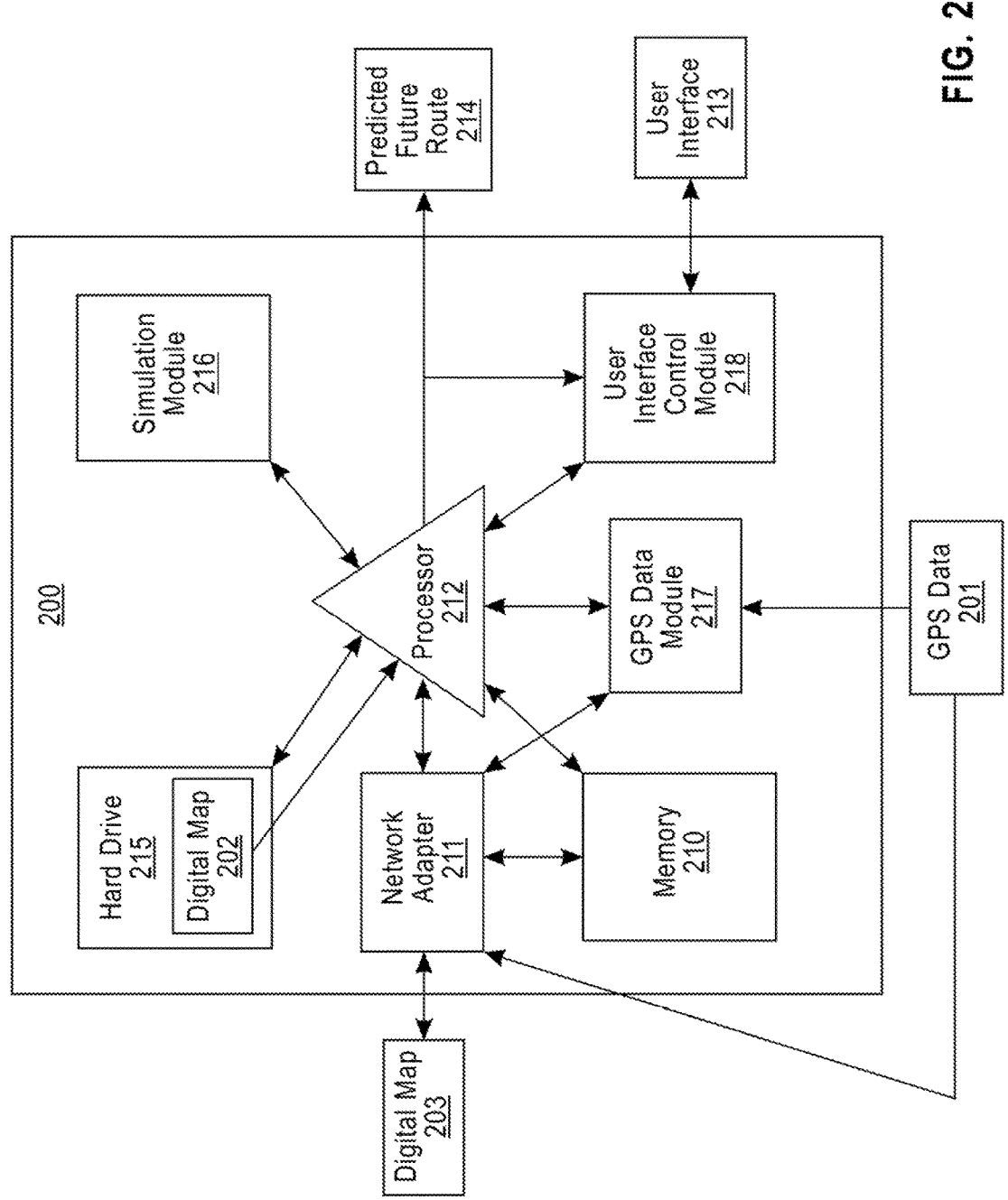
FIG. 2 illustrates a block diagram of a system according to one or more exemplary embodiments of the present invention.
Figure 3:
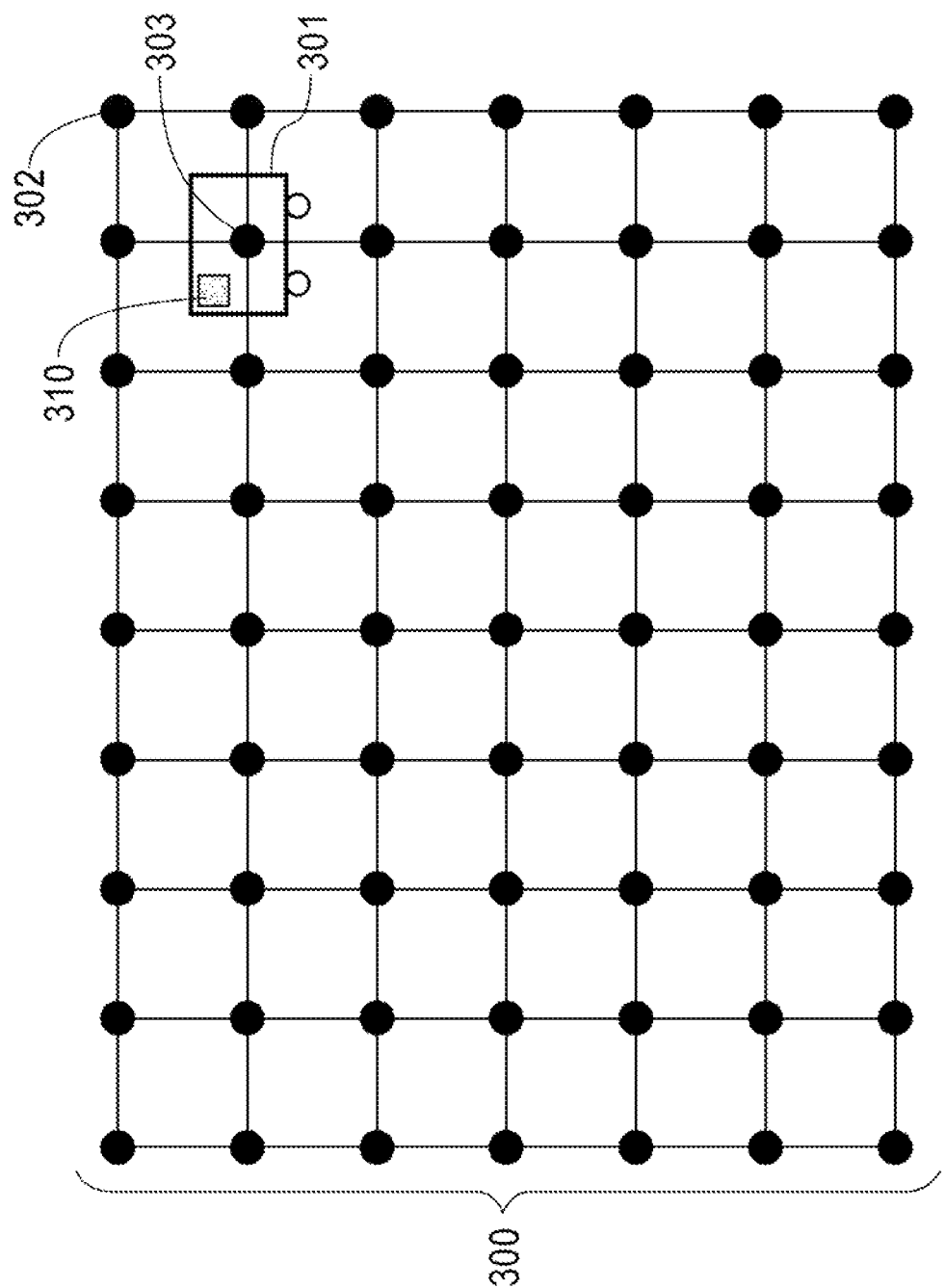
FIG. 3 illustrates a road network including a plurality of geographic nodes according to one or more exemplary embodiments of the present invention.
Figure 4:
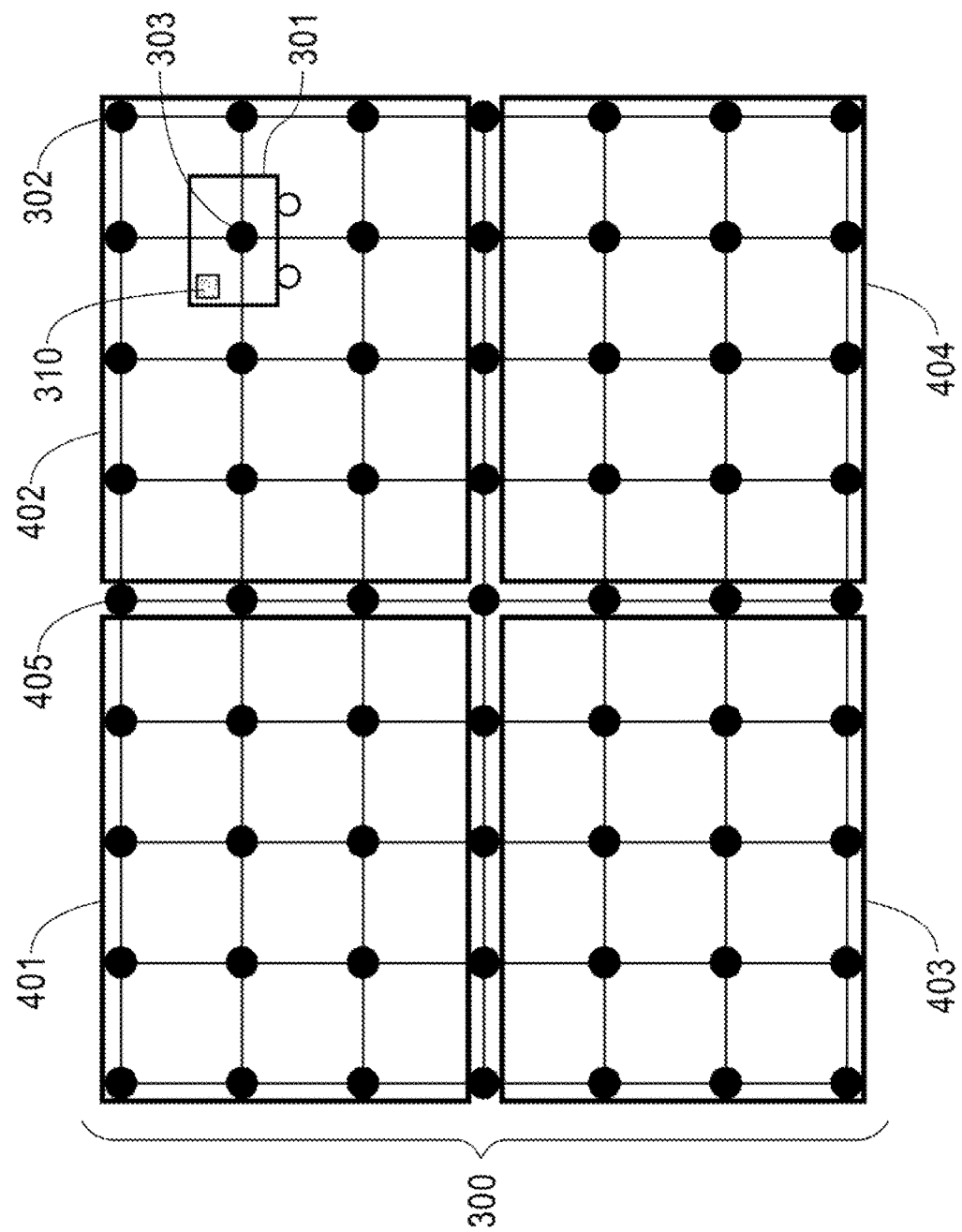
FIG. 4 illustrates a partitioned road network including a plurality of geographic nodes and a plurality of boundary nodes according to one or more exemplary embodiments of the present invention.

FIG. 2 illustrates a block diagram of a system according to one or more exemplary embodiments of the present invention. FIG. 3 illustrates a road network including a plurality of geographic nodes according to one or more exemplary embodiments of the present invention. FIG. 4 illustrates a partitioned road network including a plurality of geographic nodes and a plurality of boundary nodes according to one or more exemplary embodiments of the present invention.

Referring to FIGS. 1-4, a computer-implemented method of predicting a vehicular route according to an exemplary embodiment of the present invention includes receiving GPS data 201 (e.g., GPS data from a GPS unit 310 positioned in a vehicle 301) identifying a current location of the vehicle 301 on a road network 300. The method includes receiving a digital map (e.g., a digital map 202 or a digital map 203) representing the road network 300. The digital map includes a plurality of partitioned regions (e.g., partitioned regions 401, 402, 403 and/or 404). Each of the partitioned regions includes a plurality of geographic nodes 302. The method includes selecting a starting node 303 from the plurality of geographic nodes 302 based on the current location of the vehicle 301 on the road network 300. The method includes selecting at least one partitioned region of the plurality of portioned regions based on a predetermined travel-time horizon (see, e.g., FIG. 8—travel time-horizons are discussed in more detail below with reference to FIG. 8) of the vehicle 301 from the starting node 303. The at least one portioned region includes a partitioned region in which the vehicle 301 is currently located. The method includes performing route simulation (see, e.g., FIGS. 6 and 7—route simulation is discussed in more detail below with reference to FIGS. 6 and 7) between the plurality of geographic nodes 302 of the selected at least one partitioned region and generating a plurality of potential future routes (see, e.g., FIGS. 6 and 7—generating potential future routes is discussed in more detail below with reference to FIGS. 6 and 7) between the geographic nodes 302 of the selected at least one partitioned region. The method includes detecting an actual route of the vehicle (e.g., a path of travel with respect to a plurality of the geographic nodes 302 based on received GPS data 201) between the geographic nodes 302 of the partitioned region in which the vehicle 301 is currently located. The method includes comparing the actual route of the vehicle 301 in the partitioned region in which the vehicle 301 is currently located with the plurality of potential future routes. The method includes determining a probability of the vehicle 301 traveling along each potential future route of the plurality of potential future routes. The method includes predicting a future route of the vehicle 301 based on the probability of the vehicle 301 traveling along each potential future route of the plurality of potential future routes.

A system 200 according to an exemplary embodiment of the present invention includes a memory 210 storing a computer program, and a network adapter 211 operatively coupled to the memory 210. The network adapter receives GPS data 201 identifying a current location of the vehicle 301 on the road network 30. A processor 212 executes the computer program. Based on instructions received from the computer program, the processor 212 receives a digital map (e.g., the digital map 202 or the digital map 203) representing the road network 300. The digital map includes a plurality of partitioned regions (e.g., partitioned regions 401, 402, 403 and/or 404). Each of the partitioned regions includes a plurality of geographic nodes 302. Based on instructions received from the computer program, the processor 212 selects a starting node 303 from the plurality of geographic nodes 302 based on the current location of the vehicle 301 on the road network 300. Based on instructions received from the computer program, the processor 212 selects at least one partitioned region of the plurality of portioned regions based on a predetermined travel-time horizon (see, e.g., FIG. 8—travel time-horizons are discussed in more detail below with reference to FIG. 8) of the vehicle 301 from the starting node 303. The at least one portioned region includes a partitioned region in which the vehicle 301 is currently located. Based on instructions received from the computer program, the processor 212 performs route simulation (see, e.g., FIGS. 6 and 7—route simulation is discussed in more detail below with reference to FIGS. 6 and 7) between the plurality of geographic nodes 302 of the selected at least one partitioned region and generating a plurality of potential future routes (see, e.g., FIGS. 6 and 7—generating potential future routes is discussed in more detail below with reference to FIGS. 6 and 7) between the geographic nodes 302 of the selected at least one partitioned region. Based on instructions received from the computer program, the processor 212 detects an actual route of the vehicle 301 (e.g., a path of travel with respect to a plurality of the geographic nodes 302 based on received GPS data 201) between the geographic nodes 302 of the partitioned region in which the vehicle 301 is currently located. Based on instructions received from the computer program, the processor 212 compares the actual route of the vehicle 301 in the partitioned region in which the vehicle 301 is currently located with the plurality of potential future routes. Based on instructions received from the computer program, the processor 212 determines a probability of the vehicle 301 traveling along each potential future route of the plurality of potential future routes. Based on instructions received from the computer program, the processor 212 predicts a future route 214 of the vehicle 301 based on the probability of the vehicle 301 traveling along each potential future route of the plurality of potential future routes.

According to exemplary embodiments of the present invention, the digital map 202 may include a plurality of digital maps, each corresponding to a particular roadway in a particular geographic area (e.g., a map covering a predetermined number of square miles of a particular city or suburb). The digital map 202 may be stored on a hard drive 215 of the system 200. The digital map 203 may be received from outside the system 200. For example, the digital map 203 may be retrieved from the cloud or over an internet connection. The digital map 203 may be received by the network adapter 211. The digital map 203 may be received by the processor 212 of the system 200.

According to an exemplary embodiment of the present invention, the system 200 may include a user interface 213 configured to display vehicle routes to a user. The user interface 213 may include a digital display. The user interface 213 may be controlled by a user interface control module 218 included in the system 200.

According to an exemplary embodiment of the present invention, the GPS data 201 may be received by a GPS data module 217 included in the system 200. The GPS data module 217 may include a memory accessible by the processor 212. Thus, the GPS data 201 may be accessed by the processor 212 via the GPS control module 217.

The system 200 according to an exemplary embodiment of the present invention may include a simulation module 216. The simulation module 216 may perform route simulation between the plurality of geographic nodes 302 of the selected at least one partitioned region and generating a plurality of potential future routes between the geographic nodes 302 of the selected at least one partitioned region.

According to an exemplary embodiment of the present invention, performing route simulation between the plurality of geographic nodes 302 of the selected at least one partitioned region may include simulating substantially all possible routes within the selected at least one partitioned region from the starting node. The process of simulating routes between the plurality of geographic nodes 302 of the selected at least one partitioned region and generating a plurality of potential future routes between the geographic nodes 302 of the selected at least one partitioned region will be discussed in more detail below with reference to FIGS. 6 and 7.

According to an exemplary embodiment of the present invention, route simulation between the plurality of geographic nodes 302 of the selected at least one partitioned region and generating a plurality of potential future routes between the geographic nodes 302 of the selected at least one partitioned region may be performed in a distributed computing environment. Thus, according to one or more exemplary embodiments of the present invention, a processing load on a computer processor (e.g., processor 212) may be reduced by distributing processing of each potential vehicle route in selected partitioned regions through distributed processing in which potential vehicle routes in each portioned region are respectively simulated by different processors, or different groups of processors.

According to an exemplary embodiment of the present invention, predicting a future route of the vehicle 301 may include generating a suggestion for an alternative route. According to an exemplary embodiment of the present invention, the alternative route may be determined based on traffic conditions in at least one partitioned region. According to an exemplary embodiment of the present invention, the probability of the vehicle 301 traveling along each potential future route may be determined based on whether each potential future route is a fastest route through at least one partitioned region. According to an exemplary embodiment of the present invention, the probability of the vehicle 301 traveling along each potential future route may be determined based on whether each potential future route is a shortest route through at least one partitioned region.

According to an exemplary embodiment of the present invention, predicting a future route of the vehicle 301 based on the probability of the vehicle 302 traveling along each potential future route of the plurality of potential future routes may be performed substantially in real-time. Thus, vehicle routes may be simulated by a computer relatively quickly by selectively simulating potential vehicle routes only in selected partitioned regions. For example, route simulation may be performed faster than if all possible routes (e.g., including irrelevant routes) across an entire road network are simulated by selectively simulating potential vehicle routes only in selected partitioned regions.

Thus, faster lead times may be achieved for generating relevant computer-simulated future travel routes of a vehicle without historical vehicle route data. Thus, data packets including future travel routes of a vehicle may be generated by a computer processor relatively quickly, and may be delivered to a user (e.g., via a display in the vehicle) relatively quickly without the need for user input. Additionally, accuracy of predicted vehicle future routes may be increased without the use of historical vehicle route data.

Referring to FIGS. 3 and 4, the road network 300 may include a plurality of geographic nodes 302. Each geographic node 302 may designate a unique geographic location of a road network. For example, each geographic node 302 may mark a unique latitude and longitude on a digital map (e.g., 202 or 203). The vehicle 301 may be positioned substantially at a particular geographic node 302, and that geographic node 302 may be designated the starting node 303. The vehicle 301 may include the GPS unit 310, which may determine a current location of the vehicle with respect to a closest geographic node 302.

The road network 300 may be partitioned into a plurality of partitioned regions. For example, the road network 300 may be partitioned into a first partitioned region 401, a second partitioned region 402, a third partitioned region 403 and a fourth partitioned region 404. Each portioned region may include at least one boundary node 405 at a boundary between two adjacent partitioned regions. As an example, each partitioned region may cover a predetermined area, such as a predetermined number of square miles. Alternatively, partitioned regions may be areas that can be traversed within a predetermined about of time (e.g., each partitioned region representing an area that can be directly traversed from end to end in 15 minutes).

According to an exemplary embodiment of the present invention, portioned regions that are relevant to the vehicle

301 may be selected (e.g., partitioned regions that the vehicle 301 could reach within a predetermined travel-time horizon). For example, selecting at least one partitioned region of the plurality of portioned regions may include selecting the at least one partitioned region based on a travel direction of the vehicle 301. For example, if the vehicle 301 is currently in the second partitioned region 402, and each of the first partitioned region 401 and the fourth partitioned region 404 are reachable within the predetermined travel-time horizon, then the first partitioned region 401 and the fourth partitioned region 404 may be potentially selected (e.g., as well as the second partitioned region 402 in which the vehicle 301 is currently located); however, if the vehicle 301 is currently traveling in the direction of only the fourth partitioned region 404, then the first partitioned region 401 might not be selected based on the travel direction of the vehicle 301. The process of selecting partitioned regions will be described in more detail below with reference to FIGS. 4 and 5.

According to an exemplary embodiment of the present invention, each partitioned region may include at least one boundary node 405. Selecting at least one partitioned region of the plurality of portioned regions may be based on a predetermined travel-time horizon includes determining if the at least one boundary node of each partitioned region is within the predetermined travel-time horizon. The use of boundary nodes will be described in more detail below with reference to FIGS. 4, 5 and 8.

Figure 5:
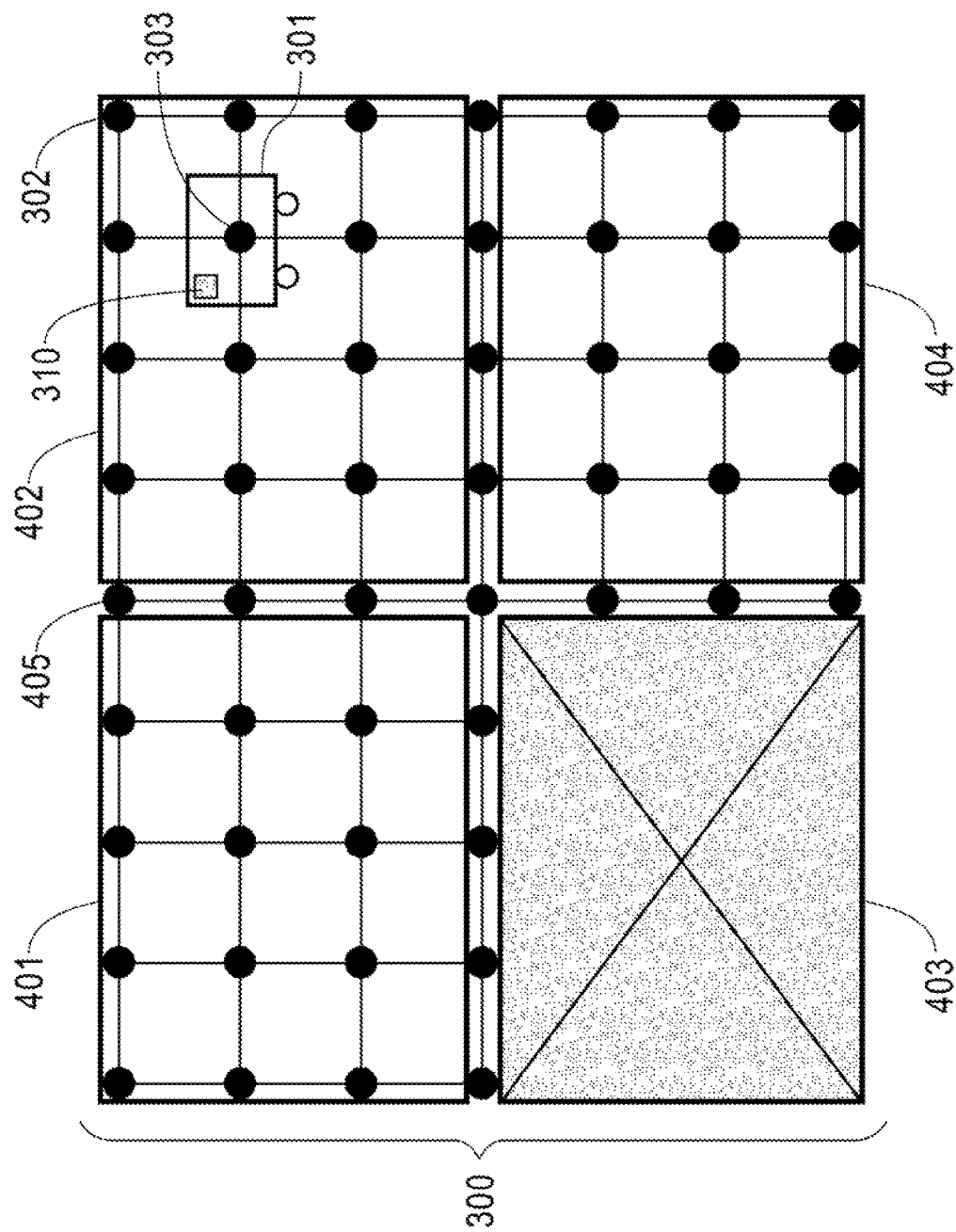
FIG. 5 illustrates a partitioned road network including a plurality of geographic nodes and a plurality of boundary nodes according to one or more exemplary embodiments of the present invention.

FIG. 5 illustrates a partitioned road network including a plurality of geographic nodes and a plurality of boundary nodes according to one or more exemplary embodiments of the present invention.

Referring to FIGS. 4 and 5, the road network 300 may be partitioned into a plurality of partitioned regions. For example, the road network 300 may be partitioned into the first partitioned region 401, the second partitioned region 402, the third partitioned region 403 and the fourth partitioned region 404. Each portioned region may include at least one boundary node 405 at a boundary between two adjacent partitioned regions. A starting node 303 that is closest to the vehicle 301 may be determined. A subset of the partitioned regions may be selected based on a distance from the starting node 303. For example, if at least one boundary node 405 of a particular partitioned region may be reached within a predetermine travel-time horizon then that partitioned region may be selected. As an example, if the vehicle 301 is in the second partitioned region 402 and the first partitioned region 401 (e.g., a boundary node 405 of the first partitioned region 401) and the fourth partitioned region 404 (e.g., a boundary node 405 of the fourth partitioned region 404) may each be reached within the predetermined travel-time horizon, then the first and fourth partitioned regions 401 and 404 may be selected. However, if the third partitioned region 403 (e.g., a boundary node 405 of the third partitioned region 403) cannot be reached within the predetermined travel-time horizon, then the third partitioned region 403 might not be selected.

As an example, the starting node 303 of the vehicle 301 may be identified in the second partitioned region 402, and a virtual clock may be initialized at time point 0 (e.g., t refers to a time point, and time point 0 may be represented by t=0). Time point 0 may be set as a starting point and may be used to compute an earliest possible arrival time at each boundary node 405 connecting the second partitioned region 402 with an adjacent partitioned region. If at a particular boundary node 405, the earliest possible arrival time (e.g., W refers to an amount of time to arrive at a particular boundary node) is less than (e.g., t<W) then an adjacent partitioned region sharing that boundary node 405 with the second partitioned region 402 may be selected as a relevant partitioned region. An earliest arrival time at each boundary node 405 may be determined, and may be used to identify each relevant partitioned region. For example, if even one boundary node 405 of a particular partitioned region satisfies t<W then a partitioned region associated with that boundary node 405 will be selected. As discussed below in more detail, route simulation may be performed in each selected (e.g., relevant) partitioned region.

The terms "partition" and "partitioned region" may be used interchangeably herein. The terms "node" and "geographic node" may be used interchangeably herein. The term "prediction window" may refer to an area defined by a particular travel-time horizon herein.

Figure 6:
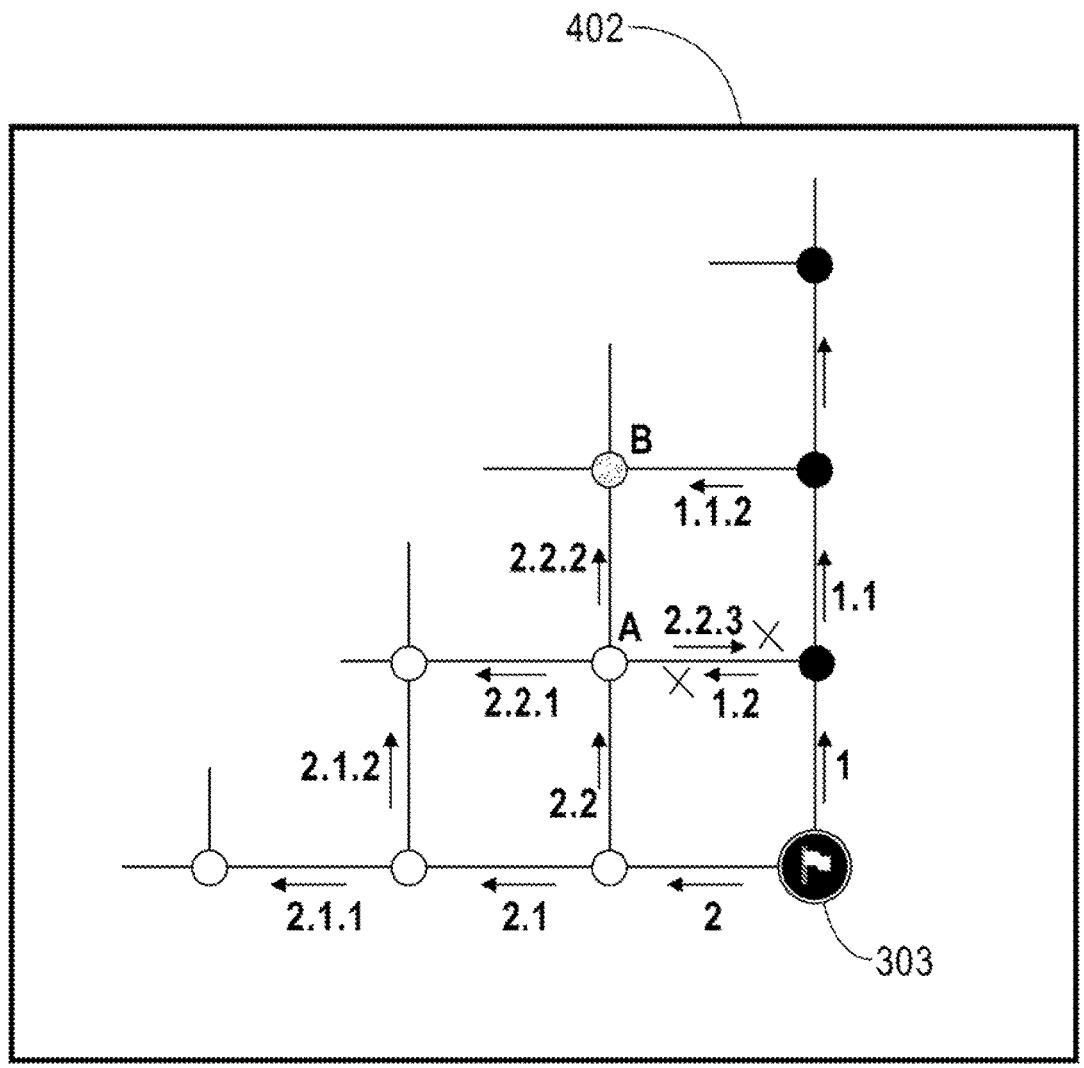
FIG. 6 illustrates one partitioned region of a road network according to one or more exemplary embodiments of the present invention.
Figure 7:
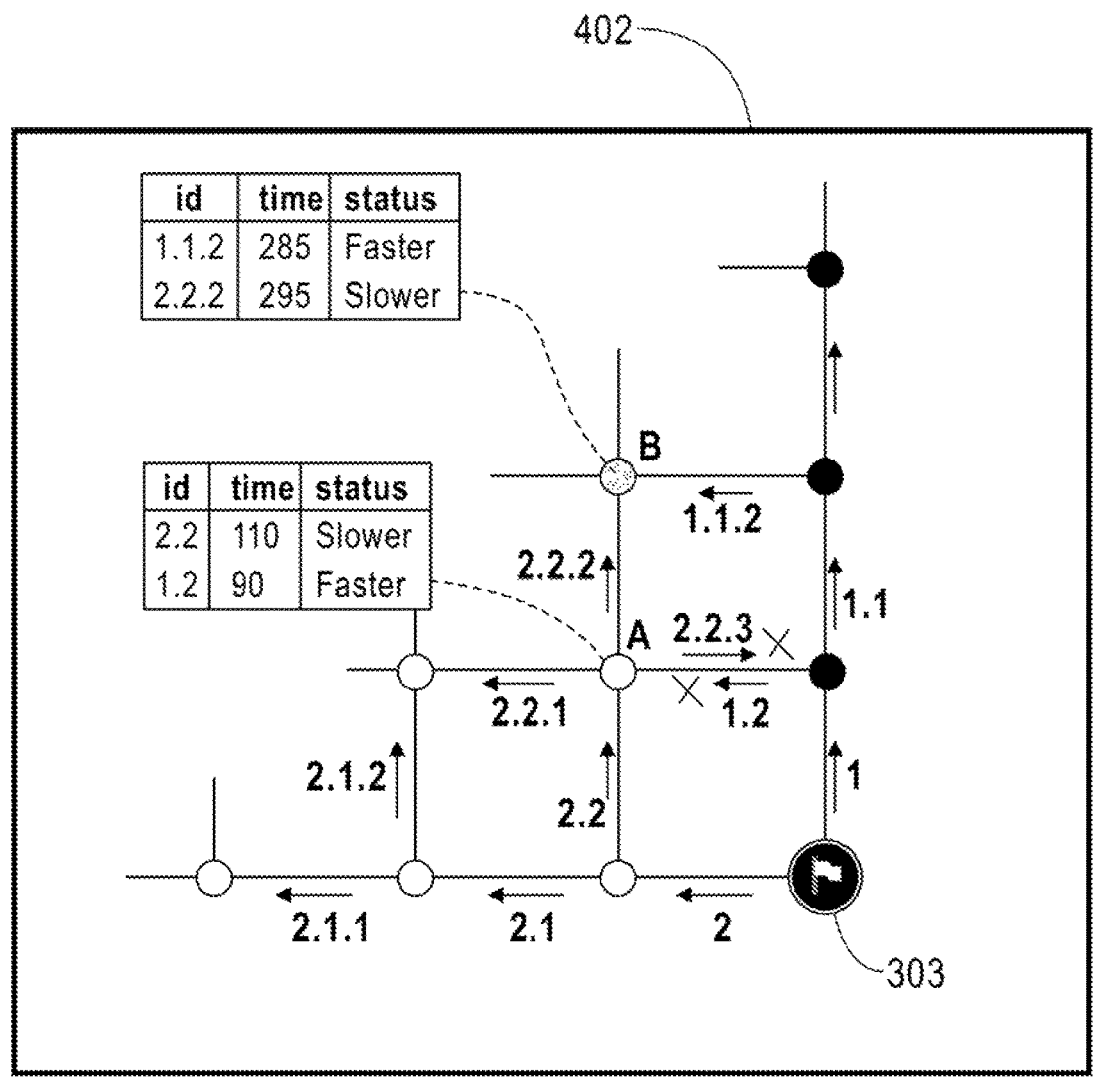
FIG. 7 illustrates one partitioned region of a road network according to one or more exemplary embodiments of the present invention.

FIG. 6 illustrates one partitioned region of a road network according to one or more exemplary embodiments of the present invention. FIG. 7 illustrates one partitioned region of a road network according to one or more exemplary embodiments of the present invention.

Referring to FIGS. 6 and 7, exemplary processes of route simulation in a selected partitioned region will be described in more detail. Each geographic node 302 within a particular partitioned region may be a potential starting node 303. From the perspective of each geographic node 302, possible routes to each other geographic node 302 may be simulated and potential routes of travel (e.g. fastest or shortest routes) may be selected. For example, a geographic node 302 that is north of a starting node 303 would likely not be reached by traveling south. Thus, a simulation of a route in which a northern geographic node is reached by traveling south would be eliminated as a potential route of travel.

As an example, a geographic node A might be reachable by one of two routes from a starting node 303. Node A may be reachable via route 2+2.2. Alternatively, node A may be reachable via route 1+1.2. Thus, both routes will be simulated. If route 1+1.2 is a shorter and faster route to node A than route 2+2.2 then it may be determined that a vehicle traveling on route 1 or route 1+1.2 may pass through node A in the future, while a vehicle traveling on route 2 would not pass through node A. A vehicle's (e.g., vehicle 301) actual route of travel may be detected (e.g., whether the vehicle travels on route 1 or route 2), and compared with the simulated routes. For example, if vehicle 301 has an actual route of travel on route 2, then vehicle 301 would not be expected to pass through node A.

As an example, a geographic node B might be reachable by a number of routes starting from a starting node 303. For example, node B may be reachable via route 1.1.2 or 2.2.2. Thus, both routes (as well as other possible routes) will be simulated. If route 1.1.2 is a faster route then it may be determined that a vehicle traveling on route 1.1.2 may pass through node B in the future, while a while a vehicle traveling on route 2.2.2 would not pass through node B. A vehicle's (e.g., vehicle 301) actual route of travel may be detected (e.g., whether the vehicle travels on route 1.1.2 or route 2.2.2), and compared with the simulated routes. For example, if vehicle 301 has an actual route of travel on route 2.2.2, then vehicle 301 would not be expected to pass through node A.

Both nodes A and B, described above, may be exemplary geographic nodes 302 of a selected partitioned region.

According to an exemplary embodiment of the present invention, a discrete-event simulation technology may be employed, which may employ only a single thread to simulate a route of a vehicle 301. A discrete-event simulation (DES) may model or simulate one or more events of a system as a discrete sequence of events in time. Each event may occur at a particular instant in time and may mark a change of state in a particular system. In DES, it may be assumed that no change in the system occurs between each discrete event. Thus a simulation may be simplified by jumping from one discrete event to another. This may reduce a processing load on a computer processor and may increase a rate at which a computer processor can simulate a route of a vehicle 301.

Figure 8:
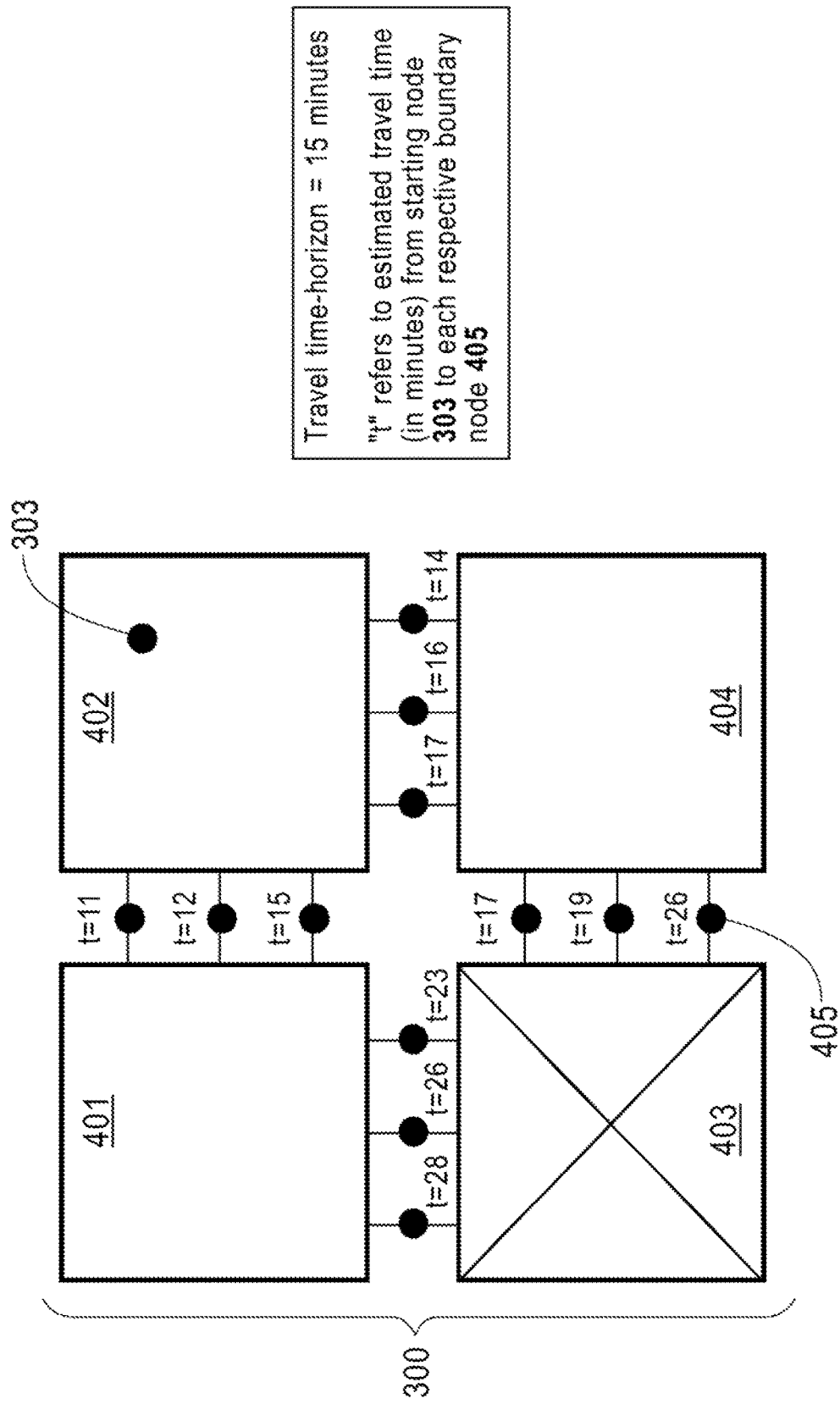
FIG. 8 illustrates a partitioned road network including a plurality of boundary nodes according to one or more exemplary embodiments of the present invention.

FIG. 8 illustrates a partitioned road network including a plurality of boundary nodes according to one or more exemplary embodiments of the present invention.

Referring to FIG. 8, the first, second, third and fourth partitioned regions 401, 402, 402 and 404 are illustrated spaced further apart from each other than in FIGS. 4 and 5 for clarity of the more detailed description below focusing on the boundary nodes 405. However, the boundary nodes 405 are substantially the same as the boundary nodes 405 described above.

According to an exemplary embodiment of the present invention, each partitioned region may include at least one boundary node 405. Selecting at least one partitioned region of the plurality of portioned regions may be based on a predetermined travel-time horizon includes determining if the at least one boundary node of each partitioned region is within the predetermined travel-time horizon. According to an exemplary embodiment of the present invention, at least one boundary node 405 may fall within a predetermined travel-time horizon.

According to an exemplary embodiment of the present invention, the travel-time horizon may refer to a furthest point that the vehicle 301 can reach from its current location. For example, the travel-time horizon may refer to a most distant geographic node 302 that the vehicle 301 can reach from the starting node 303. The travel-time horizon may refer to a plurality of geographic nodes 302, each representing a most distant possible point that the vehicle 301 can respectively reach in a plurality of direction. As an example, the travel-time horizon of the vehicle from the starting node 303 may be in a range of from about 5 minutes to about 30 minutes (e.g., 15 minutes).

As an example, each of the boundary nodes 405 between the first partitioned region 401 and the second partitioned region 402 are within the exemplary travel-time horizon of 15 minutes (e.g., t=11, t=12 and t=15 for respective boundary nodes 405 between the first partitioned region 401 and the second partitioned region 402). Alternatively none of the boundary nodes 405 between the first partitioned region 401 and the third partitioned region 403 or between the fourth partitioned region 404 and the third partition region 403 are within the exemplary travel-time horizon of 15 minutes (e.g., t=28, t=26, t=23, t=17, t=19 and t=26 for respective boundary nodes 405 between the first partitioned region 401 and the third partitioned region 403 and between the fourth partitioned region 404 and the third partitioned region 403). Thus, the third partitioned region 403 would not be selected, while the first and fourth 401 and 404 partitioned regions would be selected for a 15 minute time-travel horizon from starting node 303 in partitioned region 402.

According to an exemplary embodiment of the present invention, partitioning a road network (e.g., road network 300) into a plurality of partitions may include applying a maximal diameter between two boundary nodes 405. The maximum diameter may be based on a physical distance (e.g., a predetermined number of miles) between two boundary nodes 405. The maximum diameter of a partition may be determined based on graph theory as the longest and/or shortest path between any two nodes of a partition. Thus, partitions of substantially equal size may be determined; however, exemplary embodiments of the present invention are not limited thereto. This may lead to a substantially evenly distributed processing load on one or more computer processors.

Route simulation may be performed for currently irrelevant partitioned regions (e.g., regions outside the predetermined travel-time horizon) as computing capacity becomes available. This may efficiently reduce the load on a computer processor at a later time point, and may allow for more efficient overall processing of an entire road network. Thus, computer processing resources may be used relatively efficiently, and route simulation error rates may be reduced.

A computer program product according to an exemplary embodiment of the present invention includes a computer readable storage medium having program instructions embodied therewith. The program instructions are executable by a processor (e.g., processor 212, described above in more detail; or processor 901, described below in more detail) to cause the processor to receive a current location of a vehicle 301 on a road network 300. The program instructions are executable by a processor to cause the processor to receive a digital map (e.g., the digital map 202 or the digital map 203) representing a road network. The digital map includes a plurality of partitioned regions (e.g., partitioned regions 401, 402, 403 and/or 404). Each of the partitioned regions includes a plurality of geographic nodes 302. The program instructions are executable by a processor to cause the processor to select a starting node 303 from the plurality of geographic nodes 302 based on the current location of the vehicle 301 on the road network 300. The program instructions are executable by a processor to cause the processor to select at least one partitioned region of the plurality of portioned regions based on a predetermined travel-time horizon of the vehicle 301 from the starting node 303. At least one portioned region includes a partitioned region in which the vehicle 301 is currently located. The program instructions are executable by a processor to cause the processor to perform route simulation between the plurality of geographic nodes 302 of the selected at least one partitioned region and generating a plurality of potential future routes between the geographic nodes 302 of the selected at least one partitioned region. The program instructions are executable by a processor to cause the processor to detect an actual route of the vehicle 301 between the geographic nodes 302 of the partitioned region in which the vehicle 301 is currently located. The program instructions are executable by a processor to cause the processor to compare the actual route of the vehicle 301 in the partitioned region in which the vehicle 301 is currently located with the plurality of potential future routes. The program instructions are executable by a processor to cause the processor to determine a probability of the vehicle 301 traveling along each potential future route of the plurality of potential future routes. The program instructions are executable by a processor to cause the processor to predict a future route of the vehicle 301 based on the probability of the vehicle 301 traveling along each potential future route of the plurality of potential future routes.

Figure 9:
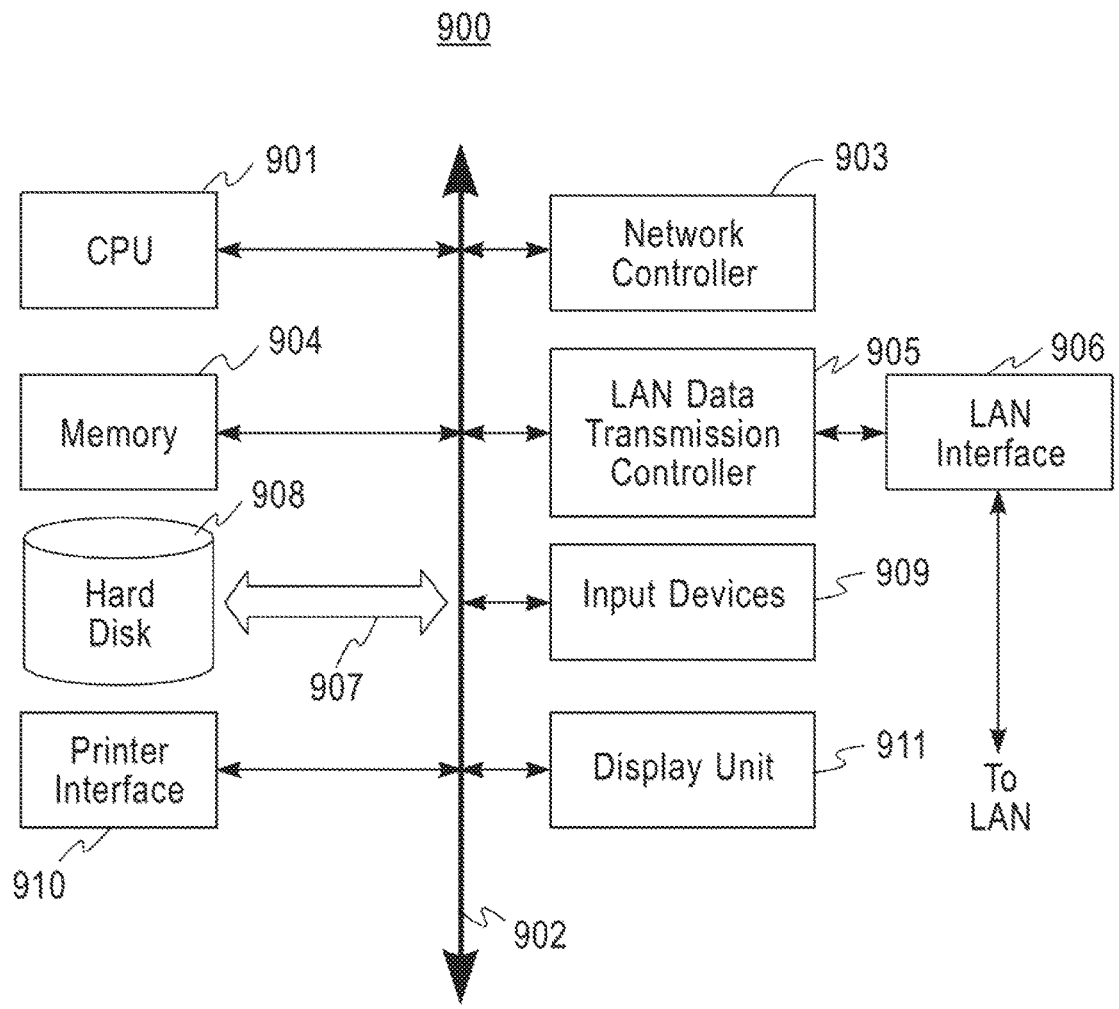
FIG. 9 illustrates an example of a computer system capable of implementing the methods according to exemplary embodiments of the present invention.

FIG. 9 illustrates an example of a computer system capable of implementing the methods according to exemplary embodiments of the present invention. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 900 may include, for example, a central processing unit (CPU) 901, random access memory (RAM) 904, a printer interface 910, a display unit 911, a local area network (LAN) data transmission controller 905, a LAN interface 906, a network controller 903, an internal bus 902, and one or more input devices 909, for example, a keyboard, mouse etc. As shown, the system 900 may be connected to a data storage device, for example, a hard disk, 908 via a link 907.

Figure 10:
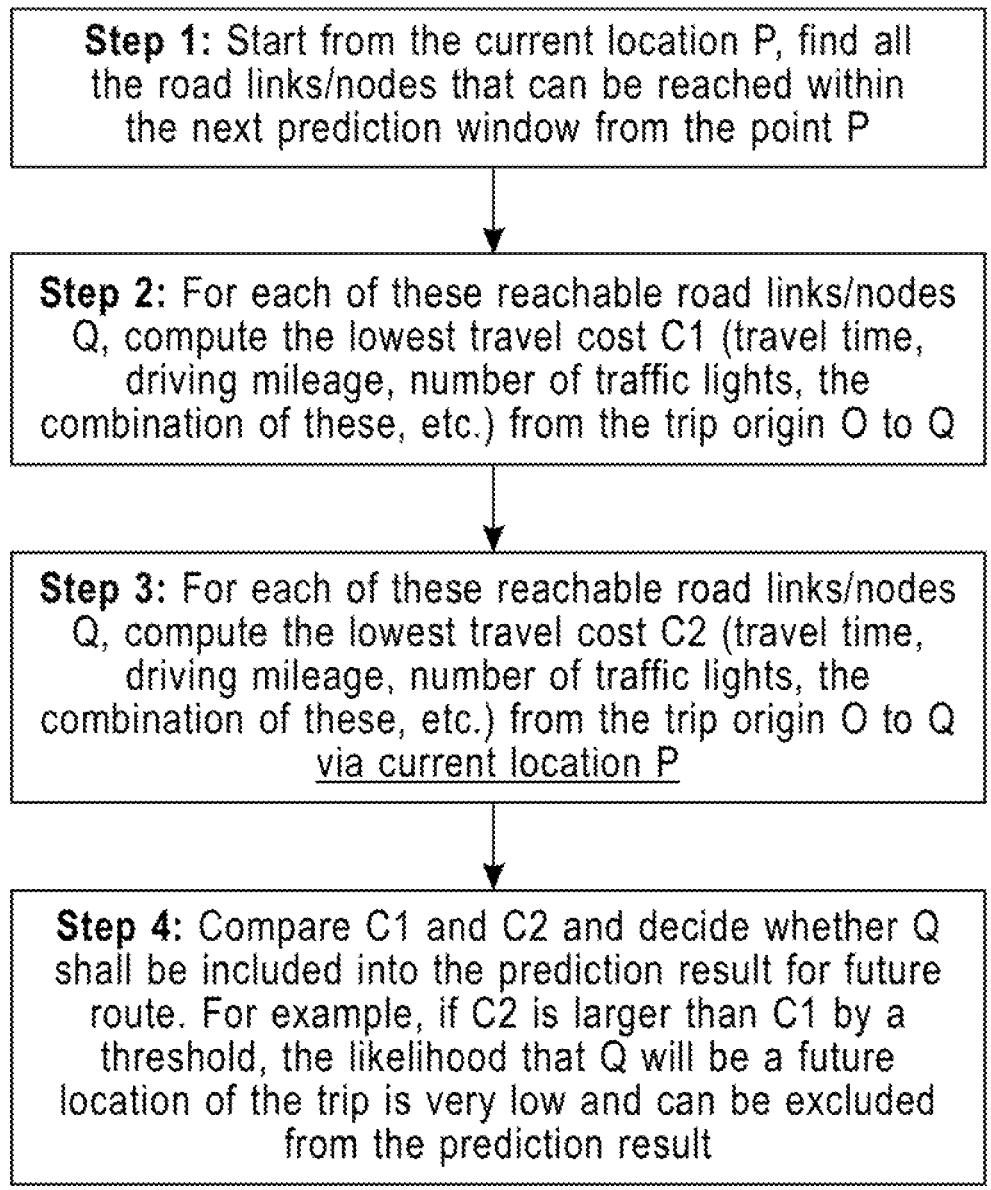
FIG. 10 illustrates a method according to an exemplary embodiment of the present invention.

FIG. 10 illustrates a method according to an exemplary embodiment of the present invention.

Referring to FIG. 10, according to an exemplary embodiment of the present invention, potential future routes of a vehicle may be determined based on a cost of travel to each of a plurality of geographic nodes 302 within a particular travel-time window, or within a particular partitioned region.

Referring to FIG. 10, step 1 and step 2~4 may be executed in a pipeline manner. Whenever a location P in step 1 is discovered, computation in step 2-4 may be performed for this point substantially immediately. If this point is unlikely to be a future location, route simulation might not be performed for further subsequent locations via this point P.

The road network partitioning approach can be applied similarly in the computation of step 2-3.

According to an exemplary embodiment of the present invention, travel costs may be pre-computed for each location pairs in a road network. Then the online computation in step 2-3 can be replaced by corresponding cost query operation.

The descriptions of the various exemplary embodiments of the present invention have been presented for purposes of illustration, but are not intended to be exhaustive or limited to the exemplary embodiments disclosed. Many modifications and variations will be apparent to those of ordinary skill in the art without departing from the scope and spirit of the described exemplary embodiments. The terminology used herein was chosen to best explain the principles of the exemplary embodiments, or to enable others of ordinary skill in the art to understand exemplary embodiments described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and/or block diagrams in the figures illustrate the architecture, functionality, and operation of possible implementations of systems, methods, and computer program products according to various exemplary embodiments of the invention. In this regard, each block in the flowchart or block diagrams may represent a module, segment, or portion of instructions, which comprises one or more executable instructions for implementing the specified logical function(s). In alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been particularly shown and described with reference to exemplary embodiments thereof, it will be understood by those of ordinary skill in the art that various changes in form and detail may be made therein without departing from the spirit and scope of the present invention as defined by the following claims.

The invention claimed is:

1. A computer-implemented method of predicting a vehicular route, comprising:
   receiving GPS data identifying a current location of a vehicle on a road network;
   receiving a digital map representing the road network, wherein the digital map includes a plurality of partitioned regions, and wherein each of the partitioned regions includes a plurality of geographic nodes;
   selecting a starting node from the plurality of geographic nodes based on the current location of the vehicle on the road network;
   selecting at least one partitioned region of the plurality of portioned regions based on a predetermined travel-time horizon of the vehicle from the starting node, wherein the at least one portioned region includes a partitioned region in which the vehicle is currently located;
   performing route simulation between the plurality of geographic nodes of the selected at least one partitioned region and generating a plurality of potential future routes between the geographic nodes of the selected at least one partitioned region;
   detecting an actual route of the vehicle between the geographic nodes of the partitioned region in which the vehicle is currently located;
   comparing the actual route of the vehicle in the partitioned region in which the vehicle is currently located with the plurality of potential future routes;
   determining a probability of the vehicle traveling along each potential future route of the plurality of potential future routes; and
   predicting a future route of the vehicle based on the probability of the vehicle traveling along each potential future route of the plurality of potential future routes.

2. The computer-implemented method of claim 1, wherein each partitioned region includes at least one boundary node, and wherein selecting at least one partitioned region of the plurality of portioned regions based on a predetermined travel-time horizon includes determining if the at least one boundary node of each partitioned region is within the predetermined travel-time horizon.

3. The computer-implemented method of claim 1, wherein predicting a future route of the vehicle based on the probability of the vehicle traveling along each potential future route of the plurality of potential future routes is performed substantially in real-time.

4. The computer-implemented method of claim 1, wherein performing route simulation between the plurality of geographic nodes of the selected at least one partitioned region includes simulating substantially all possible routes within the selected at least one partitioned region from the starting node.

5. The computer-implemented method of claim 1, wherein selecting at least one partitioned region of the plurality of portioned regions includes selecting the at least one partitioned region based on a travel direction of the vehicle.

6. The computer-implemented method of claim 1, wherein the travel-time horizon of the vehicle from the starting node is in a range of from about 5 minutes to about 30 minutes.

7. The computer-implemented method of claim 1, wherein predicting a future route of the vehicle includes generating a suggestion for an alternative route.

8. The computer-implemented method of claim 7, wherein the alternative route is determined based on traffic conditions in at least one partitioned region.

9. The computer-implemented method of claim 1, wherein the probability of the vehicle traveling along each potential future route is determined based on whether each potential future route is a fastest route through at least one partitioned region.

10. The computer-implemented method of claim 1, wherein the probability of the vehicle traveling along each potential future route is determined based on whether each potential future route is a shortest route through at least one partitioned region.

11. A system, comprising:
    a memory storing a computer program;
    a network adapter operatively coupled to the memory, wherein the network adapter receives GPS data identifying a current location of a vehicle on a road network; and
    a processor that executes the computer program, wherein based on instructions received from the computer program the processor:
    receives a digital map representing the road network, wherein the digital map includes a plurality of partitioned regions, and wherein each of the partitioned regions includes a plurality of geographic nodes;

selects a starting node from the plurality of geographic nodes based on the current location of the vehicle on the road network;

selects at least one partitioned region of the plurality of portioned regions based on a predetermined travel-time horizon of the vehicle from the starting node, wherein the at least one portioned region includes a partitioned region in which the vehicle is currently located;

performs route simulation between the plurality of geographic nodes of the selected at least one partitioned region and generating a plurality of potential future routes between the geographic nodes of the selected at least one partitioned region;

detects an actual route of the vehicle between the geographic nodes of the partitioned region in which the vehicle is currently located;

compares the actual route of the vehicle in the partitioned region in which the vehicle is currently located with the plurality of potential future routes;

determines a probability of the vehicle traveling along each potential future route of the plurality of potential future routes; and predicts a future route of the vehicle based on the probability of the vehicle traveling along each potential future route of the plurality of potential future routes.

12. The system of claim 11, wherein the system further comprises a user interface configured to display vehicle routes to a user.

13. The system of claim 11, wherein performing route simulation between the plurality of geographic nodes of the selected at least one partitioned region and generating a plurality of potential future routes between the geographic nodes of the selected at least one partitioned region is performed in a distributed computing environment.

14. The computer-implemented method of claim 11, wherein each partitioned region includes at least one boundary node, and wherein selecting at least one partitioned region of the plurality of portioned regions based on a predetermined travel-time horizon includes determining if the at least one boundary node of each partitioned region is within the predetermined travel-time horizon.

15. The computer-implemented method of claim 11, wherein predicting a future route of the vehicle based on the probability of the vehicle traveling along each potential future route of the plurality of potential future routes is performed substantially in real-time.

16. The computer-implemented method of claim 11, wherein selecting at least one partitioned region of the plurality of portioned regions includes selecting the at least one partitioned region based on a travel direction of the vehicle.

17. The computer-implemented method of claim 12, wherein predicting a future route of the vehicle includes generating a suggestion for an alternative route and displaying the suggestion for the alternative route to a user via the user interface.

18. The computer-implemented method of claim 11, wherein the probability of vehicle traveling along each potential future route is determined based on whether each potential future route is a fastest route through at least one partitioned region.

19. The computer-implemented method of claim 11, wherein the probability of vehicle traveling along each potential future route is determined based on whether each potential future route is a shortest route through at least one partitioned region.

20. A computer program product comprising a computer readable storage medium having program instructions embodied therewith, the program instructions executable by a processor to cause the processor to:

receive a current location of a vehicle on a road network;

receive a digital map representing a road network, wherein the digital map includes a plurality of partitioned regions, and wherein each of the partitioned regions includes a plurality of geographic nodes;

select a starting node from the plurality of geographic nodes based on the current location of the vehicle on the road network;

select at least one partitioned region of the plurality of portioned regions based on a predetermined travel-time horizon of the vehicle from the starting node, wherein the at least one portioned region includes a partitioned region in which the vehicle is currently located;

perform route simulation between the plurality of geographic nodes of the selected at least one partitioned region and generating a plurality of potential future routes between the geographic nodes of the selected at least one partitioned region;

detect an actual route of the vehicle between the geographic nodes of the partitioned region in which the vehicle is currently located;

compare the actual route of the vehicle in the partitioned region in which the vehicle is currently located with the plurality of potential future routes;

determine a probability of the vehicle traveling along each potential future route of the plurality of potential future routes; and predict a future route of the vehicle based on the probability of the vehicle traveling along each potential future route of the plurality of potential future routes.

* * * * *